(12) United States Patent
Li et al.

(10) Patent No.: US 9,537,817 B2
(45) Date of Patent: Jan. 3, 2017

(54) METHOD AND APPARATUS FOR OBTAINING DESTINATION IP ADDRESS

(71) Applicant: Huawei Device Co., Ltd., Shenzhen (CN)

(72) Inventors: Xiaojuan Li, Beijing (CN); Shuiping Long, Beijing (CN); Hui Jin, Beijing (CN); Guodong Xue, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 370 days.

(21) Appl. No.: 14/144,273

(22) Filed: Dec. 30, 2013

(65) Prior Publication Data

US 2014/0115187 A1    Apr. 24, 2014

Related U.S. Application Data

(63) Continuation of application No. PCT/CN2012/079174, filed on Jul. 26, 2012.

(30) Foreign Application Priority Data

Jul. 26, 2011    (CN) .......................... 2011 1 0210931

(51) Int. Cl.
   G06F 15/173   (2006.01)
   H04L 29/12    (2006.01)
   H04W 4/00     (2009.01)

(52) U.S. Cl.
   CPC .......... *H04L 61/1588* (2013.01); *H04W 4/005* (2013.01)

(58) Field of Classification Search
   CPC ............. H04L 61/1588; H04L 61/2514; H04L 29/12367; H04W 80/04; H04W 4/005
   See application file for complete search history.

(56) References Cited

U.S. PATENT DOCUMENTS 8,374,187 B2 * 2/2013 Morand .............. H04L 61/2015
                                                              370/351
8,504,723 B2 * 8/2013 Kohli .................. H04L 63/0281
                                                              709/238
(Continued)

FOREIGN PATENT DOCUMENTS

CA         2772181 A1    4/2011
CN       101213813 A     7/2008
(Continued)

OTHER PUBLICATIONS

Chinese International Search Report of Patent Cooperation Treaty (PCT), Application No. PCT/CN2012/079174, date Nov. 22, 2011, 11 pages.

Primary Examiner — Liangche A Wang
Assistant Examiner — Ayele Woldemariam
(74) Attorney, Agent, or Firm — Slater Matsil, LLP

(57) ABSTRACT

Embodiments of the present invention provide a method and an apparatus for obtaining a destination IP address and are related to the field of communications technologies, for improving a data sending success rate in a network. The method includes: receiving a request sent by a terminal device, obtaining a destination IP address from a network-side device according to the request, and sending the destination IP address to the terminal device. The method and the apparatus for obtaining a destination IP address provided by the embodiments of the present invention are applied in an M2M technology.

5 Claims, 7 Drawing Sheets

(56) References Cited

U.S. PATENT DOCUMENTS

| | | | |
|---|---|---|---|
| 2007/0033650 A1 | 2/2007 | Grosse et al. | |
| 2010/0202351 A1 | 8/2010 | Xi et al. | |
| 2012/0016942 A1* | 1/2012 | Cherian | H04W 4/00 709/246 |
| 2012/0039323 A1* | 2/2012 | Hirano | H04W 36/385 370/338 |
| 2012/0082110 A1* | 4/2012 | Su | H04L 29/12349 370/329 |
| 2012/0096154 A1 | 4/2012 | Chen et al. | |
| 2012/0106391 A1* | 5/2012 | van Loon | H04L 12/1886 370/252 |
| 2012/0224516 A1 | 9/2012 | Stojanovski et al. | |

FOREIGN PATENT DOCUMENTS

| | | |
|---|---|---|
| CN | 101399815 A | 4/2009 |
| CN | 101534496 A | 9/2009 |
| CN | 101931931 A | 12/2010 |
| CN | 102045695 A | 5/2011 |
| CN | 102056112 A | 5/2011 |
| EP | 2309702 A1 | 4/2011 |
| WO | 2009103621 A1 | 8/2009 |

\* cited by examiner ns, and in particular, to a method and an
METHOD AND APPARATUS FOR OBTAINING DESTINATION IP ADDRESS This application is a continuation of international Application No. PCT/CN2012/079174, filed on Jul. 26, 2012, which claims priority to Chinese Patent Application No. 201110210931.0, filed on Jul. 26, 2011, both of which are hereby incorporated by reference in their entireties.

TECHNICAL FIELD

The present invention relates to the field of communications technologies, and in particular, to a method and an apparatus for obtaining a destination IP address.

BACKGROUND

An M2M (Machine to Machine, M2M for short) technology means that network communications are performed between one device and a plurality of devices without involvement of any person, such as factory monitoring, traffic control and management, and remote meter reading. This technology is integrated with communications and network technologies, connects various devices in people's life to form a network, creates a variety of applications, and promotes the intelligent development of industrial production.

In the future, with the continuous improvement of mobile communications network bandwidth and introduction of trillions of terminal devices, services of Internet of things will inevitably develop into a platform mode; and a platform mode based on the M2M technology may employ its business integration advantage and use GSM (global system for mobile communications), GPRS (general packet radio service), EDGE (enhanced data rate for GSM evolution), 3G (3rd-generation mobile communications technology), and so on, as access approaches, to provide a plurality of terminal-to-terminal data transmission solutions, thereby realizing intelligent control and management appreciation of terminals, and meeting customers' various information needs.

In a process of realizing data transmission between an M2M terminal device and an M2M server in the foregoing mode, when the IP address of the server (that is, a destination IP address) is not configured in the terminal device in advance, the terminal-side device cannot send uplink data to the server; or when the destination IP address becomes invalid because of upgrade maintenance or a man-made modification, the terminal device still use the old destination IP address to send uplink data, thereby causing invalid sending of the data. In both the cases, the destination IP address needs to be manually configured in the terminal device, thereby reducing a data sending success rate and weakening an intelligent degree of the M2M technology.

SUMMARY OF THE INVENTION

Embodiments of the present invention provide a method and an apparatus for obtaining a destination IP address, for improving a data sending success rate in a network.

To achieve the forgoing objective, the embodiments of the present invention adopt the following technical solutions:

In one aspect, a method for obtaining a destination IP address is provided, including:

receiving a request sent by a terminal device;

obtaining a destination IP address from a network-side device according to the request; and sending the destination IP address to the terminal device so that the terminal device sends uplink data according to the destination IP address.

In the other aspect, an apparatus for obtaining a destination IP address is provided, including:

a receiving unit, configured to receive a request sent by a terminal device;

an obtaining unit, configured to obtain a destination IP address from a network-side device; and a sending unit, configured to send the destination IP address to the terminal device so that the terminal device sends uplink data according to the destination IP address.

According to the method and the apparatus for obtaining a destination IP address provided by the embodiments of the present invention, before a terminal device sends uplink data to a server, by obtaining and sending a destination IP address, the latest destination IP address is sent to the terminal device so that the terminal device can send the uplink data according to the valid destination IP address. The embodiments of the present invention solves a problem in the prior art that: when a destination IP address is not configured in a terminal device in advance, the terminal device cannot send uplink data to a server; or when a destination IP address become invalid because of upgrade maintenance or a man-made modification, the terminal device still uses the old destination IP address to send uplink data, thereby causing invalid data sending. Therefore, the data sending success rate in a network is improved.

DETAILED DESCRIPTION OF ILLUSTRATIVE EMBODIMENTS

In the following embodiments, a terminal device is described with a machine type communications device (MTC Device) as an example, and a server is described with a machine type communications server (MTC Server) as an example. In practical application, a terminal and a server are not limited to an MTC Device and an MTC Server.

Executive subjects of all steps in method embodiments involved in the following for illustration are described with a mobility management entity (MME) as an example. In practical application, an executive subject is not limited to an MME.

Embodiment 1

Figure 1:
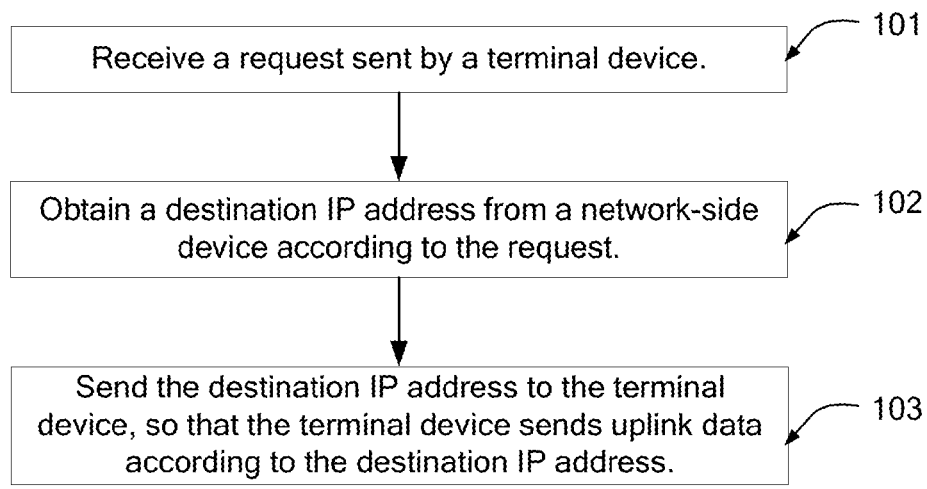
FIG. 1 is a flowchart of a method for obtaining a destination IP address according to embodiment 1 of the present invention.

This embodiment discloses a method for obtaining a destination IP address. As shown in FIG. 1, the method includes the following steps:

Step 101: Receive a request sent by an MTC Device.

Step 102: Obtain a destination IP address from a network-side device according to the request.

Step 103: Send the destination IP address to the MTC Device that initiates the request, so that the MTC Device accurately sends uplink data according to the destination IP address.

It should be noted that, the network-side device includes but is not limited to: a home subscriber server (HSS), a serving gateway (S-GW), or a packet data gateway (P-GW).

Optionally, a request sent by a terminal device is a mobility management request, and the mobility management request includes: an attach request or a tracking area update (TAU) request.

Optionally, the obtaining a destination IP address from the network-side device includes sending a location update request to a home subscriber server, and receiving a location update response sent by the home subscriber server. Subscription data is carried in the response includes a network provided destination feature and a destination IP address.

Optionally, the sending the destination IP address to the terminal device includes sending a mobility management request response to the terminal device. The mobility management request response carries a destination IP address, and the mobility management request response includes an attach request response or a tracking area update request response.

Optionally, the request sent by the terminal device is a service request, and before receiving the service request, the method further includes receiving a subscription data sent by the home subscriber server. The subscription data carries a network provided destination feature.

Correspondingly, obtaining a destination IP address from the network-side device includes sending a modify bearer request or a create bearer request to a gateway device to obtain the destination IP address that is obtained by the gateway device when it is determined, according to the network provided destination feature, that a destination IP address is sent to the terminal device. The modify bearer request or the create bearer request carries the network provided destination feature. Obtaining a destination IP address from the network-side device further includes receiving a modify bearer response or a create bearer response sent by the gateway device. The modify bearer response or the create bearer response carries the destination IP address obtained by the gateway device. The destination IP address is sent to the terminal device through radio resources.

Further optionally, the subscription data further includes a destination IP address, and correspondingly, obtaining the destination IP address from the network-side device includes extracting the destination IP address from the subscription data sent by the home subscriber server when it is determined, according to the network provided destination feature, that a destination IP address is sent to the terminal device.

Figure 2:
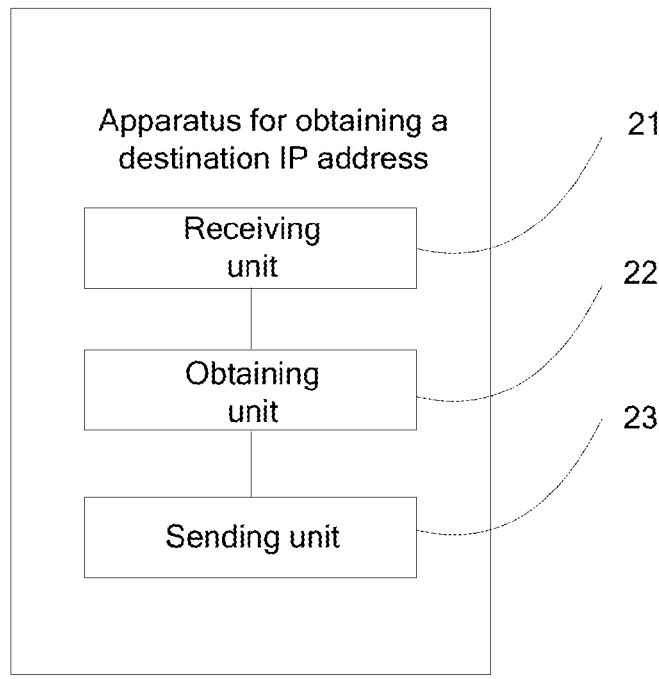
FIG. 2 is a schematic diagram of an apparatus for obtaining a destination IP address according to embodiment 1 of the present invention.

To achieve the purpose of obtaining the destination IP address in the above, the present invention further provides an apparatus. As shown in FIG. 2, the apparatus includes: a receiving unit 21, an obtaining unit 22, and a sending unit 23. The receiving unit 21 is configured to receive a request sent by an MTC Device. The obtaining unit 22 is configured to obtain a destination IP address from a network-side device. The sending unit 23 is configured to send the destination IP address to the MTC Device so that the MTC Device sends uplink data according to the destination IP address.

By using the method and the apparatus for obtaining a destination IP address provided by this embodiment, before the MTC Device sends uplink data, the destination IP address may be configured in the MTC Device to avoid the situation that the uplink data cannot be sent because no destination IP address is configured in the MTC Device; or to avoid the situation that, when the destination IP address is changed, the MTC Device still uses the old destination IP address to send the uplink data, causing a problem of invalid data sending.

Embodiment 2

A technical solution provided by this embodiment is applicable to a situation that an MTC Device does not attach to a network. In this situation, when the MTC Device sends an attach request, an MME has a destination IP address carried in an attach request response and sends the response to the MTC Device.

When an IP address (destination IP address) of an MTC Server is not configured in the MTC Device, or a configured destination IP address becomes invalid, the network sends a destination IP address to the MTC Device when the MTC Device attaches to the network.

In this solution, a destination IP address is stored in a home subscriber server (Home Subscriber Server, HSS for short) as subscription data, and meanwhile, a network provided destination feature of the MTC Device is also stored in the HSS as subscription data. In a GPRS/UMTS network, the subscription data is stored in a home location register (Home Location Register, HLR for short).

Figure 3:
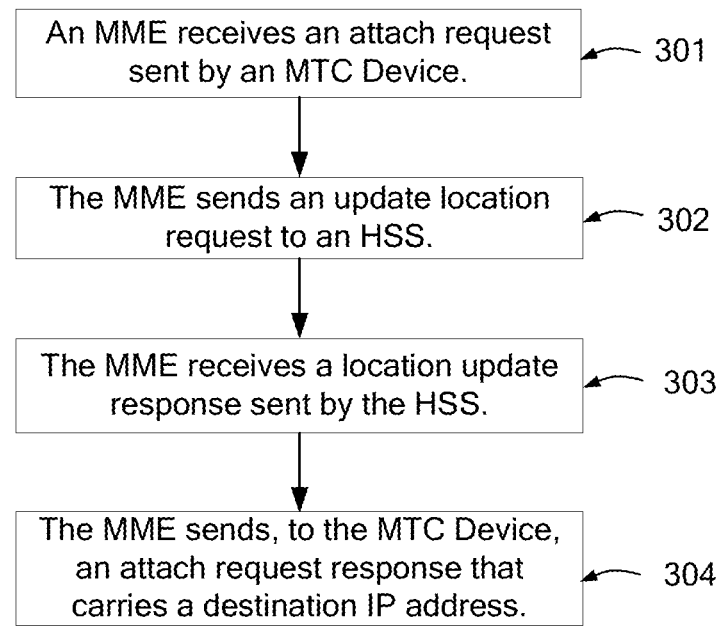
FIG. 3 is a flowchart of a method for obtaining a destination IP address according to embodiment 2 of the present invention.

As shown in FIG. 3, the method for obtaining a destination IP address provided in this embodiment includes the following steps:

Step 301: A mobility management entity MME receives an attach request sent by an MTC Device.

Step 302: The MME sends a location update request (Update Location) to an HSS.

The MME sends the location update request (Update Location) to the HSS to ask the HSS to perform location update on the MTC Device.

Step 303: The MME receives a location update response sent by the HSS.

The MME receives the location update response sent by the HSS, where the location update response carries subscription data of the MTC Device, and the subscription data includes an network of the MTC Device provided destination feature (MTC Network Provided Destination for Uplink Data Feature) and the destination IP address. The destination IP address is an IP address of an MTC Server.

Step 304: The MME sends, to the MTC Device, an attach request response that carries the destination IP address.

The MME sends, to the MTC Device, the attach request response that carries the destination IP address.

It should be noted that: after the step of sending the destination IP address, the MME may receive an attach complete message from the MTC Device. The message not only indicates that the MTC Device has received the destination IP address, but also indicates that attachment of the device to the network is completed.

The method for obtaining a destination IP address provided in this embodiment is applicable to a situation of attaching an MTC Device to a network or changing a network, can complete obtaining and sending of a destination IP address at the same time when network attachment is performed on the MTC Device, and avoid a situation that the uplink data cannot be sent because no destination IP address is configured in the MTC Device, or avoid a situation that, when the destination IP address is changed, the MTC Device still uses the old destination IP address to send the uplink data, causing a problem of invalid data sending.

Embodiment 3

A technical solution provided by this embodiment is applicable to a situation that an MTC Device has attached to a network. When the geographical location of the MTC Device changes from one MME management area to another MME management area, the MTC Device needs to send a tracking area update request to an MME, and the MME has a destination IP address carried in a tracking area update request response and sends the response to the MTC Device.

When the destination IP address configured in the MTC Device becomes invalid, the network specifies a destination IP address for the MTC Device when the MTC Device performs a tracking area update.

In this solution, a destination IP address is stored in an HSS as subscription data, and meanwhile, a network provided destination feature of the MTC Device is also stored in the HSS as subscription data.

Figure 4:
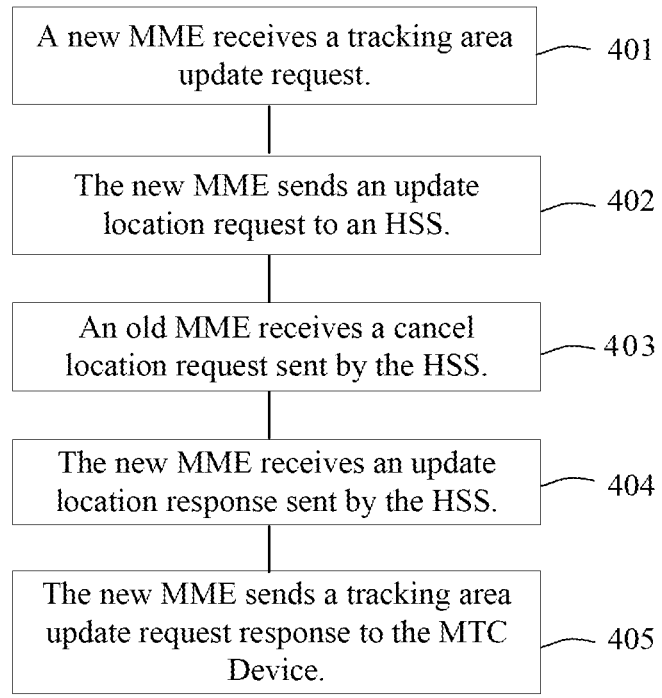
FIG. 4 is a flowchart of a method for obtaining a destination IP address according to embodiment 3 of the present invention.

As shown in FIG. 4, the method for obtaining a destination IP address provided in this embodiment includes the following steps:

Step 401: A new MME receives a tracking area update request sent by an MTC Device.

The MTC Device moves from a management area of an old IP address obtaining device, namely an old MME, to a management area of a new IP address obtaining device, namely a new MME. The new MME receives the tracking area update request sent by the MTC Device.

Step 402: The new MME sends a location update request to an HSS.

The MME sends the location update request to the HSS, to request the HSS to perform location update to the MTC Device.

Step 403: The old MME receives a cancel location request (Cancel Location Request).

After receiving the location update request sent by the new MME, the HSS sends a cancel location request (Cancel Location Request) to the old MME. It is indicated that the MTC Device has moved from the management area of the old MME to the management area of the new MME, and the task of sending a destination IP address to the MTC Device is transferred to the new MME.

Step 404: The new MME receives a location update response sent by the HSS.

The location update response carries subscription data of the MTC Device. The subscription data includes a network provided destination feature of the MTC Device and a destination IP address. The destination IP address is an IP address of an MTC Server.

Step 405: The new MME sends a tracking area update request response to the MTC Device.

The new MME has the destination IP address carried in the tracking area update request response and sends the response to the MTC Device and sends the response to the MTC Device.

After the foregoing sending step is completed, the New MME may receive a tracking area update complete message from the MTC Device. The tracking area update complete message not only indicates that the MTC Device has received the destination IP address, but also indicates that inter-area management of the device is completed.

The method for obtaining a destination IP address provided in this embodiment is applicable to the situation that an MTC Device has attached to a network, can complete obtaining and sending of a destination IP address while performing a tracking area update for the MTC Device, and avoid the situation that the uplink data cannot be sent because no destination IP address is configured in the MTC Device, or avoid the situation that, when the destination IP address is changed, the MTC Device still uses the old destination IP address to send the uplink data, causing a problem of invalid data sending.

Embodiment 4

A technical solution provided by the embodiment is applicable to a situation that an MTC Device has attached to a network. In this situation, the MTC Device sends a service request to an MME, and the MME sends a destination IP address to the MTC Device through a radio resource request.

In this situation, a network provided destination feature and a destination IP address have been sent to the MME by an HSS when the MTC Device attaches to the network, and sent to the MTC Device by the MME through an attach request. When the destination IP address in the MTC Device becomes invalid, meanwhile, after receiving the service request sent by the MTC Device, the MME sends a destination IP address to the MTC Device again. The destination IP address in this case is the destination IP address received by the MME from the HSS when the MTC Device attaches to the network. After receiving the service request, the MME does not need to obtain a destination IP address from the HSS.

Figure 5:
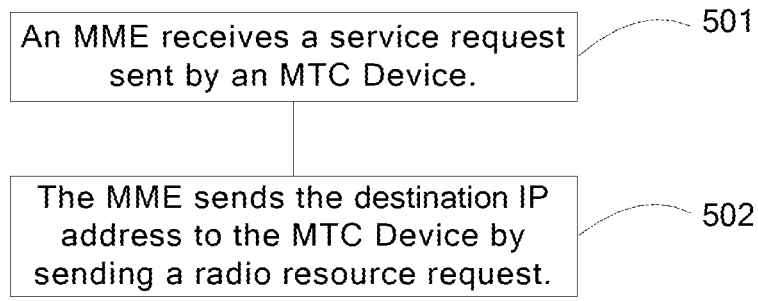
FIG. 5 is a flowchart of a method for obtaining a destination IP address according to embodiment 4 of the present invention.

As shown in FIG. 5, the method for obtaining a destination IP address provided in this embodiment includes the following steps:

Step 501: An MME receives a service request from an MTC Device.

Step 502: The MME sends the destination IP address to the MTC Device by sending a radio resource request.

The process of sending the destination IP address to the MTC Device by sending a radio resource request is as follows:

The MME sends an S1-AP context initial establishment request to an eNodeB (Evolved Node B, evolved base station). The S1-AP context initial establishment request carries the destination IP address.

After receiving the S1-AP context initial establishment request, the eNodeB parses the S1-AP context initial establishment request. Then the eNodeB sends a radio bearer request to the MTC Device and sends the destination IP address to the MTC Device through the radio bearer request.

It should be noted that, in step 502, the network provided destination feature and the destination IP address have been existed in the MME, and with the need of obtaining the destination IP address from the HSS, the MME directly sends the destination IP address according to the existed network provided destination feature after receiving the service request sent by the MTC Device.

The method for obtaining a destination IP address provided by the embodiment is applicable to a situation that a destination IP address configured in an MTC Device becomes invalid, and the reason of the invalidation may be MTC Device upgrade maintenance or a man-made modification of an IP address of an MTC server (namely the destination IP address) in the MTC Device. When the MTC Device initiates a service request, the network specifies a destination IP address for the MTC Device to avoid a situation that, when the destination IP address in the MTC Device becomes invalid, the MTC Device cannot send uplink data to the MTC Server, causing a problem of invalid data sending.

Embodiment 5

A technical solution provided by the embodiment is applicable to a situation that an MTC Device has attached to a network. In this situation, the MTC Device sends a service request to an MME, and the MME sends a destination IP address to the MTC Device through a radio resource request.

In this situation, subscription data has been sent to the MME by an HSS when the MTC Device attaches to the network. Compared with embodiment 4, in this embodiment, the subscription data does not include the destination IP address. When the MME determines that the destination IP address needs to be sent to the MTC Device according to an existed network provided destination feature, the MME obtains the destination IP address from a gateway device.

Figure 6:
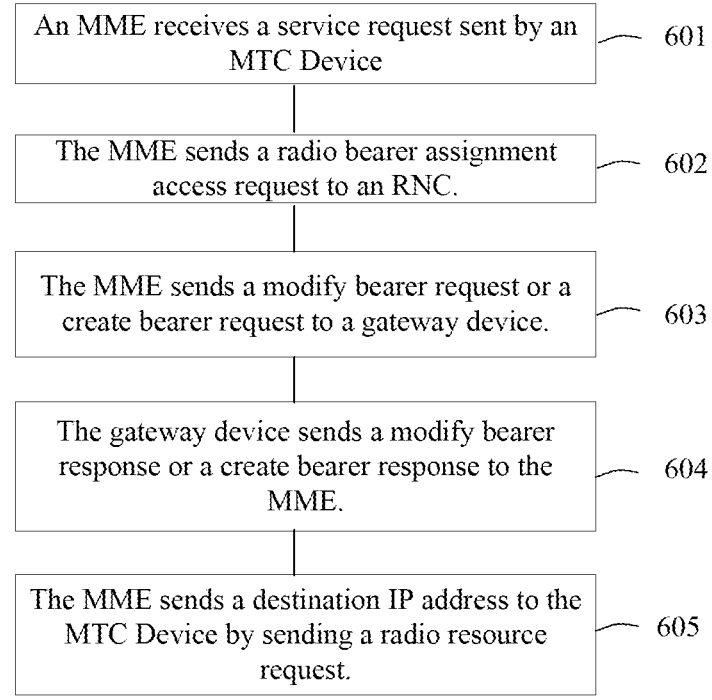
FIG. 6 is a flowchart of a method for obtaining a destination IP address according to embodiment 5 of the present invention.

As shown in FIG. 6, the method for obtaining a destination IP address provided in this embodiment includes the following steps.

Step 601: An MME receives a service request sent by an MTC Device.

Step 602: The MME sends a radio bearer assignment access request (Radio Access Bearer Assignment Request) to an RNC, so as to ensure establishment of PDP context radio bearer access.

Step 603: The MME sends a modify bearer request or a create bearer request to a gateway device in a network-side device.

Optionally, the network provided destination feature is carried in the modify bearer request or the create bearer request.

Step 604: The gateway device sends a modify bearer response or a create bearer response to the MME, where the modify bearer response or the create bearer response carries the destination IP address.

Step 605: The MME sends the destination IP address to the MTC Device by sending a radio resource request.

The process of sending the destination IP address to the MTC Device by sending a radio resource request is as follows:

The MME sends an S1-AP context initial establishment request to an eNodeB. The S1-AP context initial establishment request carries the destination IP address.

After receiving the S1-AP context initial establishment request, the eNodeB parses the S1-AP context initial establishment request. Then the eNodeB sends a radio bearer request to the MTC Device and sends the destination IP address to the MTC Device through the radio bearer request.

In the embodiment, the destination IP address is stored in the gateway device. After the MME determines that the destination IP address needs to be sent according to the network provided destination feature, the MME needs to send the network provided destination feature to the gateway device for the gateway device to search for the destination IP address.

The method for obtaining a destination IP address provided by the embodiment is applicable to the situation that no IP address is configured in an MTC Device, or a configured destination IP address becomes invalid. The network specifies a destination IP address for the MTC Device when the MTC Device initiates a service request to avoid the situation that, uplink data cannot be sent because no destination IP address is configured, or when the destination IP address is changed, the MTC Device still uses the old destination IP address to send uplink data, causing a problem of invalid data sending.

Embodiment 6

Figure 7:
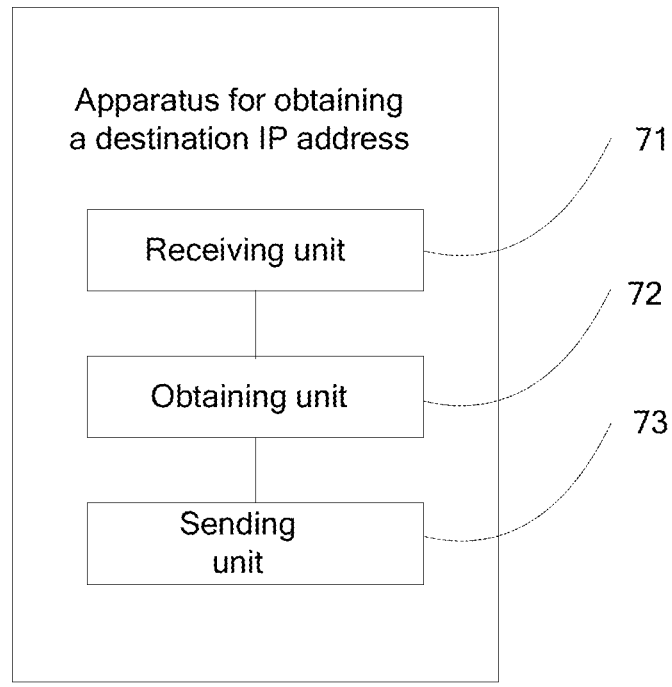
FIG. 7 is a schematic diagram of an apparatus for obtaining a destination IP address according to embodiment 6 of the present invention.

This embodiment provides an apparatus for obtaining a destination IP address. As shown in FIG. 7, the apparatus includes: a receiving unit 71, an obtaining unit 72, and a sending unit 73.

The receiving unit 71 is configured to receive a request sent by an MTC Device.

Figure 8:
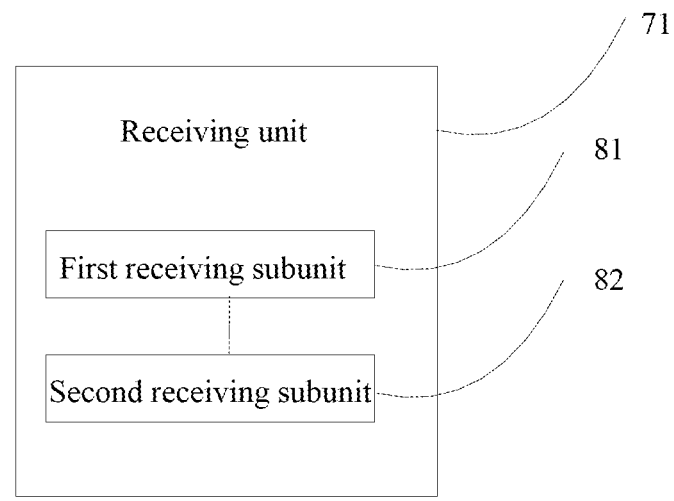
FIG. 8 is a schematic diagram of a receiving unit 71 according to embodiment 6 of the present invention.

Optionally, as shown in FIG. 8, the receiving unit 71 may further includes: a first receiving subunit 81 and a second receiving subunit 82. The first receiving subunit 81 is configured to receive a mobility management request. The mobility management request includes but is not limited to: an attach request and a tracking area update request. The second receiving subunit 82 is configured to receive a service request. The obtaining unit 72 is configured to obtain the destination IP address from a network-side device.

It should be noted that, the network-side device includes at least one of a home subscriber server HSS, a serving gateway S-GW, or a packet data gateway P-GW.

The sending unit 73 is configured to send the destination IP address to the MTC Device so that the MTC Device sends uplink data according to the destination IP address.

Figure 9:
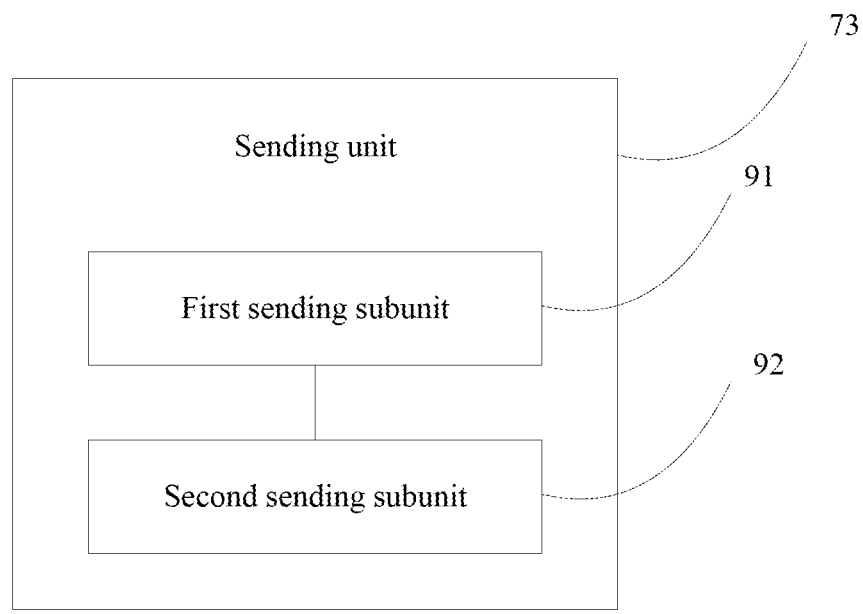
FIG. 9 is a schematic diagram of a sending unit 73 according to embodiment 6 of the present invention.

Further, as shown in FIG. 9, the sending unit 73 includes a first sending subunit 91, configured to send, to the MTC Device, a mobility management request response that carries the destination IP address, and a second sending subunit 92, configured to send, to the MTC Device, a radio resource request that carries the destination IP address.

Further, in combination with specific implementation scenarios or with different network element configurations, the obtaining unit 72 in the embodiment may at least include the following three implementation manners.

Implementation Manner 1

Figure 10:
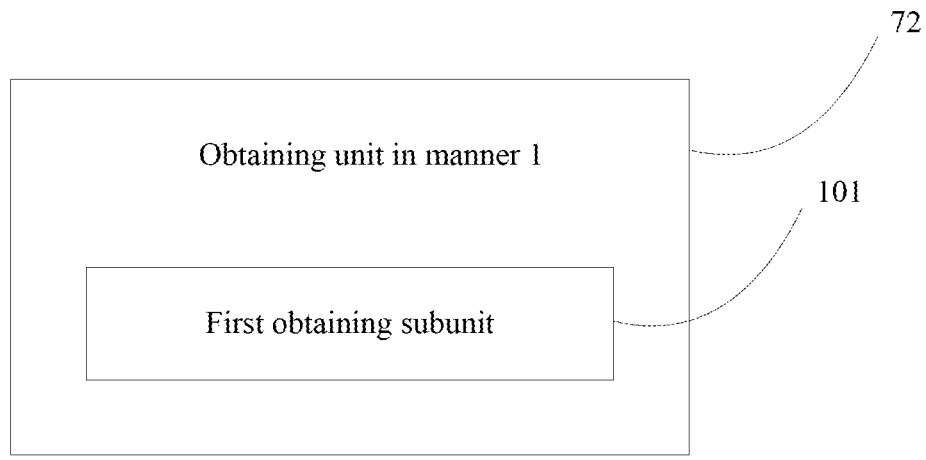
FIG. 10 is a schematic diagram of a first implementation manner of an obtaining unit according to embodiment 6 of the present invention.

In scenarios of embodiment 2 and embodiment 3, the obtaining unit 72, as shown in FIG. 10, includes a first obtaining subunit 101.

The first obtaining subunit 101 is configured to send a location update request to a home subscriber server, and receive a location update response sent by the home subscriber server. The location update response carries subscription data, and the subscription data includes: a network provided destination feature and the destination IP address.

The subscription data includes the network provided destination feature of the MTC Device and the destination IP address to be sent.

The first sending subunit 91 is configured to send, to the MTC Device, a mobility management request response that carries the destination IP address.

The mobility management request response includes an attach request response and a tracking area update request response.

Implementation Manner 2

Figure 11:
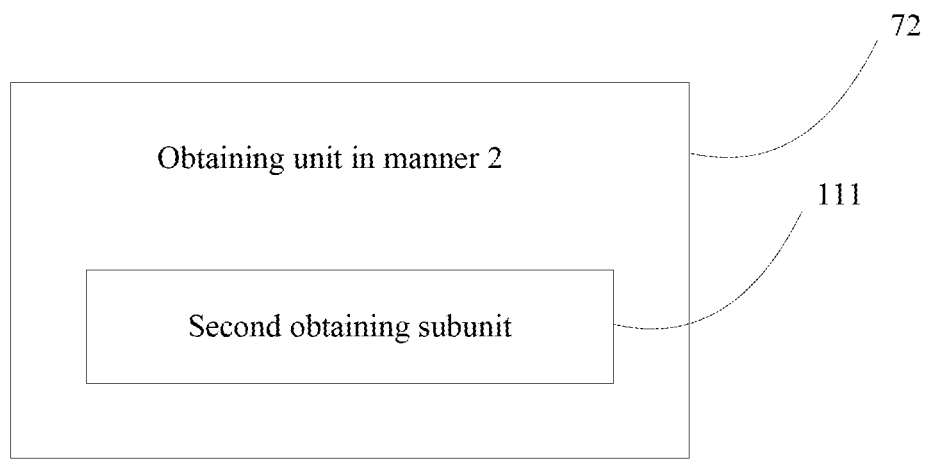
FIG. 11 is a schematic diagram of a second implementation manner of an obtaining unit according to embodiment 6 of the present invention.

In the scenario of embodiment 4, the obtaining unit 72, as shown in FIG. 11, includes a second obtaining subunit 111.

The second obtaining subunit 111 is configured to, when it is determined, according to a network provided destination feature in subscription data, that the destination IP address is sent to the terminal device, extract the destination IP address from the subscription data.

The second sending subunit 92 is configured to send, to the MTC Device, a radio resource request that carries the destination IP address.

Implementation Manner 3

Figure 12:
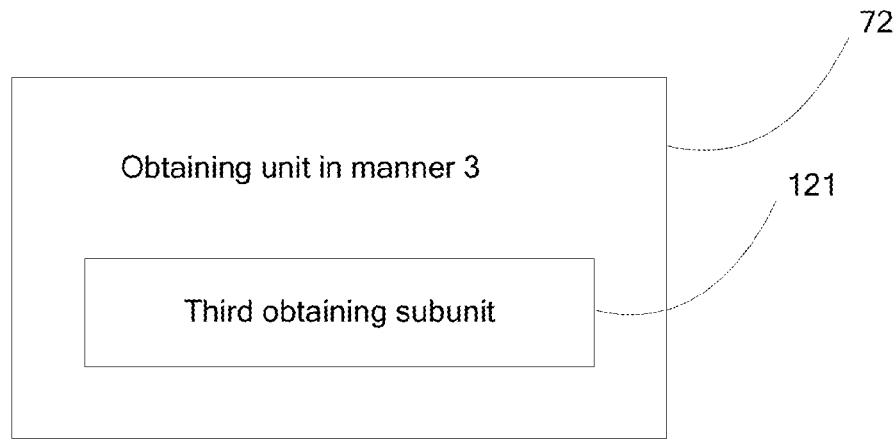
FIG. 12 is a schematic diagram of a third implementation manner of an obtaining unit according to embodiment 6 of the present invention.

In the scenario of embodiment 5, the obtaining unit 72, as shown in FIG. 12, includes a third obtaining subunit 121.

The third obtaining subunit 121 is configured to, when it is determined, according to a network provided destination feature in subscription data, that the destination IP address is sent to the terminal device, send a modify bearer request or a create bearer request to a gateway device, to obtain a destination IP address obtained by the gateway device, where the modify bearer request or the create bearer request carries the network provided destination feature; and receive a modify bearer response or a create bearer response sent by the gateway device, where the modify bearer response or the create bearer response carries the destination IP address obtained by the gateway device.

The second sending subunit 92 is configured to send, to the MTC Device, a radio resource request that carries the destination IP address.

By using the apparatus for obtaining a destination IP address provided in this embodiment, before an MTC Device sends uplink data, the destination IP address may be configured in the MTC Device to avoid the situation that the uplink data cannot be sent because no destination IP address is configured in the MTC Device; or to avoid the situation that, when the destination IP address is changed, the MTC Device still uses the old destination IP address to send the uplink data, causing a problem of invalid data sending.

Embodiment 7

Figure 13:
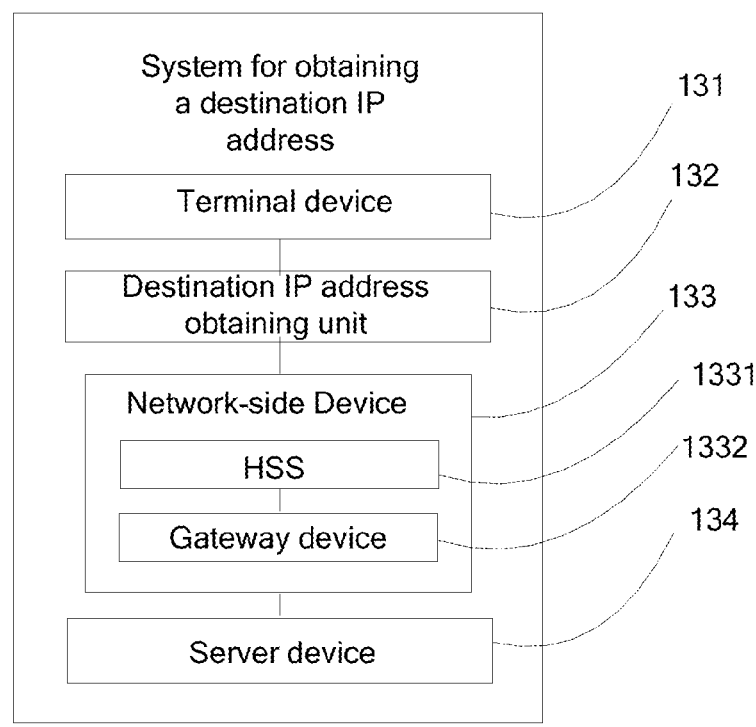
FIG. 13 is a schematic diagram of a system for obtaining a destination IP address according to embodiment 7 of the present invention.

This embodiment provides a communications system for obtaining a destination IP address, as shown in FIG. 13, including a terminal device 131, a destination IP address obtaining device 132, a network-side device 133, and a server device 134.

The terminal device 131 is an MTC Device, and is configured to send a request to the destination IP address obtaining device 132. The request includes: an attach request, a tracking area update request, and a service request. Meanwhile, the MTC Device is further configured to send uplink data to the server device 134 according to the destination IP address.

The destination IP address obtaining device 132 is configured to receive the request sent by the terminal device 131. The request includes an attach request, a tracking area update request, and a service request. A request is sent to the network-side device 133. The request includes a location update request, a modify bearer request, and a create bearer request. The destination IP address is sent to the terminal device 131. The destination IP address is delivered to the terminal device 131.

Optionally, the destination IP address obtaining device 132 is further configured to store subscription data.

Optionally, the destination IP address obtaining device 132 is further configured to send a network provided destination feature to the network-side device 133, and obtain the destination IP address from the network-side device 133.

In the present invention, the destination IP address obtaining device 132 is a mobility management entity (MME). In practical application, the destination IP address obtaining device 132 further includes but is not limited to a service GPRS support node (SGSN).

The network-side device 133, as shown in FIG. 13, includes a home subscriber server HSS 1331, and a gateway device 1332. The home subscriber server 1331 is configured to update location information of the terminal device 131, store subscription data (Subscription Data), and send the subscription data to the destination IP address obtaining device 132. In one situation, the subscription data includes a network provided destination feature and a destination IP address. In another situation, the subscription data includes a network provided destination feature.

The gateway device 1332 is configured to receive a request that carries the subscription data and is sent by the destination IP address obtaining device 132. The request includes a location update request, a modify bearer request, and a create bearer request. The gateway device 1332 is configured to determine, according to the network provided destination feature, that the destination IP address is sent to the destination IP address obtaining device 132. The gateway device 1332 is further configured to search for the destination IP address according to an IMSI, and send the destination IP address to the destination IP address obtaining device 132 through a request response sent to the destination IP address obtaining device 132.

In practical application, the home subscriber server 1331 may be but is not limited to be replaced with a home location register (HLR). The gateway device 1332 includes but is not limited to: a serving gateway (S-GW) and a packet data gateway (P-GW).

The server device 134 is an MTC Server and is a destination device to which the terminal device 131 sends uplink data. An IP address of the server device 134 is the destination IP address.

By using the system for obtaining a destination IP address provided in this embodiment, before a terminal device sends uplink data, the destination IP address may be configured in the terminal device to avoid a situation that the uplink data cannot be sent because no destination IP address is configured in the device; or to avoid a situation that, when the destination IP address is changed, the MTC Device still uses the old destination IP address to send the uplink data, causing a problem of invalid data sending.

In practical application, the network element devices in all the foregoing embodiments are not limited to an HSS, an MME, an S-GW, and a P-GW. In other standards, these network element devices may be but is not limited to be replaced with an HLR, an SGSN, a GGSN, and so on.

Based on descriptions in the foregoing embodiments, a person skilled in the art may clearly understand that the present invention may be implemented by using software plus a necessary hardware platform, and definitely may be implemented entirely through hardware. Based on such understanding, the technical solutions in the present invention may be entirely or the part contributing to the prior art may be embodied in a form of a software product. The computer software product is stored in a storage medium, such as a ROM/RAM, a magnetic disk, and a compact disk, and includes several instructions for instructing a computer device (which may be a personal computer, a server, a network device, and the like) to execute the methods provided in each embodiment of the present invention or described in certain parts of the embodiments.

The foregoing descriptions are merely specific embodiments of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for obtaining a destination IP address during a machine to machine (M2M) communication, the method comprising:
    at a mobility management entity, receiving a tracking area update request sent by a terminal device of a M2M communication network;
    at the mobility management entity, in response to the tracking area update, sending a location update request to a home subscriber server, wherein the location update request is configured to initiate a cancel location request for a prior mobility management entity serving the terminal device;
    at the mobility management entity, obtaining a destination IP address from a network-side device of the M2M communication network in response to the location update request, wherein the obtaining comprises receiving a location update response sent by the home subscriber server, wherein the location update response carries subscription data, and the subscription data comprises a network provided destination feature and the destination IP address, wherein the destination IP address is an IP address of the network-side device, wherein obtaining the destination IP address comprises
        sending a modify bearer request or a create bearer request to a gateway device, to obtain a destination IP address obtained by the gateway device when, according to the network provided destination feature in subscription data in a location update response, the destination IP address is sent to the terminal device, wherein the modify bearer request or the create bearer request carries the network provided destination feature, and
        receiving a modify bearer response or a create bearer response sent by the gateway device, wherein the modify bearer response or the create bearer response carries the destination IP address obtained by the gateway device; and
    at the mobility management entity, transmitting a tracking area update request response comprising the destination IP address from the network-side device to the terminal device; and
    at the mobility management entity, receiving a tracking area update complete message indicating the terminal device has received the destination IP address and inter-area management of the terminal device is complete so that the terminal device sends uplink data according to the destination IP address.

2. The method for obtaining a destination IP address according to claim 1, wherein the obtaining a destination IP address from a network-side device comprises extracting the destination IP address from the subscription data sent by the home subscriber server when, according to the network provided destination feature, the destination IP address is sent to the terminal device.

3. An apparatus for communication in a machine to machine (M2M) communication network, the apparatus comprising:
    a processor;
    a memory comprising a program to be executed in the processor, wherein the program comprises instructions for:
        receiving a tracking area update request sent by a terminal device in the M2M communication network;
        in response to the tracking area update, sending a location update request to a home subscriber server, wherein the location update request is configured to initiate a cancel location request for a prior mobility management entity serving the terminal device;
        obtaining a destination IP address from a network-side device according to the location update request, wherein the obtaining comprises receiving a location update response sent by the home subscriber server, wherein the location update response carries subscription data, and the subscription data comprises a network provided destination feature and the destination IP address, wherein the destination IP address is an IP address of the apparatus, wherein obtaining the destination IP address comprises
            sending a modify bearer request or a create bearer request to a gateway device, to obtain a destination IP address obtained by the gateway device when, according to the network provided destination feature in subscription data in a location update response, the destination IP address is sent to the terminal device, wherein the modify bearer request or the create bearer request carries the network provided destination feature, and
            receiving a modify bearer response or a create bearer response sent by the gateway device, wherein the modify bearer response or the create bearer response carries the destination IP address obtained by the gateway device; and
        transmitting a tracking area update request response comprising the destination IP address from the apparatus to the terminal device; and
        receiving a tracking area update complete message indicating the terminal device has received the destination IP address and inter-area management of the terminal device is complete so that the terminal device sends uplink data according to the destination IP address.

4. The apparatus according to claim 3, wherein obtaining a destination IP address comprises instructions for extracting the destination IP address from subscription data in a location update response when, according to the network provided destination feature in the subscription data, the destination IP address is sent to the terminal device.

5. The apparatus according to claim 3, wherein obtaining the destination IP address comprises further instructions for:
  sending a location update request to a home subscriber server, and receive a location update response sent by the home subscriber server, wherein the location update response carries subscription data, and the subscription data comprises a network provided destination feature and the destination IP address;
  extracting the destination IP address from the subscription data when, according to the network provided destination feature in the subscription data, the destination IP address is sent to the terminal device.

* * * * *